US006845302B2

(12) United States Patent
Moretto

(10) Patent No.: US 6,845,302 B2
(45) Date of Patent: Jan. 18, 2005

(54) AIRLINER IRREVERSIBLE-CONTROL ANTI-HIJACK SYSTEM

(76) Inventor: Jose Paul Moretto, 5403 Bilexi St., San Diego, CA (US) 92105

(*) Notice: Subject to any disclaimer, the term of this patent is extended or adjusted under 35 U.S.C. 154(b) by 0 days.

(21) Appl. No.: 10/353,141

(22) Filed: Jan. 27, 2003

(65) Prior Publication Data

US 2003/0163232 A1 Aug. 28, 2003

Related U.S. Application Data

(60) Provisional application No. 60/354,412, filed on Feb. 7, 2002.

(51) Int. Cl.[7] .............................................. G06F 7/00
(52) U.S. Cl. ............................... 701/3; 701/13; 701/14; 244/75 R; 244/121; 340/438; 340/500
(58) Field of Search ........................... 701/1, 3, 11, 13, 701/14, 15, 16; 244/75 R, 117 R, 118.5, 121; 340/438, 500, 945

(56) References Cited

U.S. PATENT DOCUMENTS

| | | | | | |
|---|---|---|---|---|---|
| 3,064,929 A | * | 11/1962 | Gard | ......................... | 244/184 |
| 3,658,277 A | * | 4/1972 | Anderson | .................... | 244/1 R |
| 3,680,499 A | * | 8/1972 | Boudreau | .................... | 109/32 |
| 3,704,845 A | * | 12/1972 | Ord | ............................ | 244/121 |
| 3,811,643 A | * | 5/1974 | Pizzo | ...................... | 244/137.2 |
| 3,841,328 A | * | 10/1974 | Jensen | ........................ | 604/135 |
| 4,112,818 A | * | 9/1978 | Garehime, Jr. | ............. | 89/41.05 |
| 4,359,733 A | * | 11/1982 | O'Neill | ........................ | 342/36 |
| 4,706,091 A | * | 11/1987 | Scott | ............................ | 342/42 |
| 5,798,458 A | * | 8/1998 | Monroe | ........................ | 73/587 |
| 6,430,488 B1 | * | 8/2002 | Goldman et al. | ............. | 701/36 |
| 6,588,705 B1 | * | 7/2003 | Frank | ...................... | 244/118.5 |

* cited by examiner

Primary Examiner—Gertrude A. Jeanglaude
(74) Attorney, Agent, or Firm—The Maxham Firm

(57) ABSTRACT

Directed toward universal commercial-airliner application as an air/ground-lifesaving function, this cost-effective retrofitable system enables airliner-pilots to conveniently actuate an inconspicuous AIRCIA™/enable-switch,—thereby instantly disabling onboard flight-commands to render the airliner's guidance-system irretrievably placed into total reliance upon its existing autopilot-system in RF-communication with encrypted remote ground/air-intercept personnel. Acting to virtually confound any criminal-attempt by a hijacker to commandeer an airliner, the airliner thus becomes flown only as directed by an authorized remote/flight-control station in cooperation with the airliner's remotely-reprogrammed onboard avionics-system, automatically vectoring the airliner to land safely via the existing avionics/autopilot-system at a designated airport. The AIRCIA™-system is initially verified for flight-worthiness operation upon every routine preflight/check-list procedure, its master ECU/restore-switch being accessible externally of the aircraft-interior. Support-system options include SmartCard®-interfacing, and automatic is engagement of AIRCIA™-system in event of natural-cause pilot-incapacitation, and ATI(automatic/tranquil-Infusion) which introduces tranquilizing-gas into the airliner's entire interior.

20 Claims, 1 Drawing Sheet

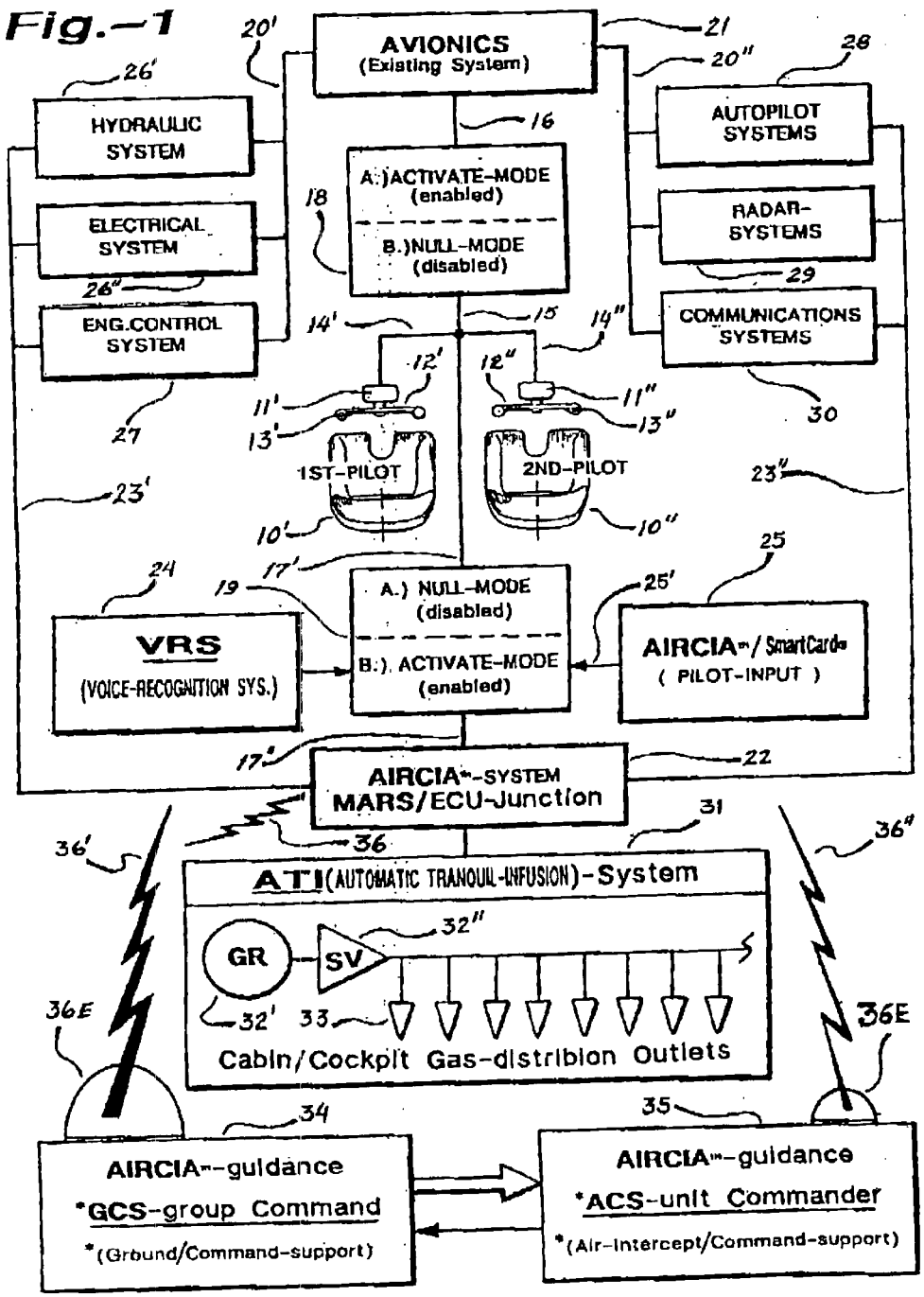

AIRLINER IRREVERSIBLE-CONTROL ANTI-HIJACK SYSTEM

This application claims the benefit of Provisional Application 60/354,412, filed Feb. 7, 2002.

I.) BACKGROUND OF THE INVENTION:

1. Field of Invention

This invention relates to airliner anti-hijack systems, and more specifically it relates to reliance upon known avionics/autopilot-system and encrypted RF-communication techniques for disabling of onboard pilot flight-commands; plus the disclosure relates to harmless gas-admixtures capable of inducing sleep.

2. Relevant Prior-Art

Background research discovery provides some prior patent-art regarded as germane to this disclosure, chronologically for example U.S. Pat. No. 3,064,929(filed: December 1958) contemplates an early example of an "automatic-guidance system" of the type employing an RF(radio-frequency)-transponder on the aircraft, whereby at least two ground-based receiver-stations are caused to comparatively interpret the coincidence of wave-signal forms. Should the reading of the signals shift out of phase, a so-called interferometer is programmed to send flight-path corrective-commands to the airborne guidance-equipment.

In U.S. Pat. No. 3,658,277(filed: December 1970) Is shown an early "aircraft anti-hijacking apparatus", which unfortunately involved a major alteration of the critical interior structural space just aft of an airliner's cockpit. The notion being, to capture a would-be hijacker within the confines of a rotary-vault like walk-through structure (imposing a severe weight penalty as well); which today is being more simply addressed in the form of a more practical reinforced cabin/interlock-door, that is still considered possibly vulnerable to breakthrough.

In U.S. Pat. No. 3,860,499(filed: October 1970) Is shown a more sophisticated anti-hijack prevention system for airliners, wherein a person seeking entry into the vulnerable cockpit-area of the airliner, is required to first show themselves at a double-reflective mirror, while making their request via a handphone staged adjacent the window. If the pilot believes the person to be a potential problem, the pilot would ask a question of the intervenor, who upon attempting to answer, would receive a spray of incapacitating-gas directed from the mouthpiece; thereby enabling the intervenor to be taken into custody while under influence of the gas. The concept is reasonable, however ineffective against a more sophisticated hijacker aware of such a contingency.

In U.S. Pat. No. 3,704,845(filed: January 1971) is shown an airliner anti-hijack prevention system, wherein Is provided a special access-restrictive bulletproof bulkhead and door openable only from the cockpit: while any communication is afforded via an inter-communicational message-signaling device. The effectiveness of such a system has never been proven in actual use.

In U.S. Pat. No. 3,811,643(filed. November 1972) is shown an airliner anti-hijacking system which employs pilot-actuated trapdoor at the cabin-to-cockpit passageway, whereby a would be hijacker is dropped into a capsule located thereunder which can be released via a bomb-bay door like arrangement; whereto a recovery-parachute would float the offender earthwardly.

In U.S. Pat. No. 3,841,328(filed: August 1972) is shown an airliner anti-hijacking apparatus in the form of a pilot-actuated hypodermic like device located beneath the passenger-seats, which can be selectively driven via a solenoid to instantly sedate/euthanize the hijacker.

In U.S. Pat. No. 4,112,818(filed. July 1974) is shown an airliner anti-hijacking apparatus which is a longitudinally arranged cabin-ceiling mounted rail to which is electrically-traversed a pilot-controlled surveillance/robot-unit having a video-camera within a tubular-housing with abaxially arranged firearm-barrels for remote-targeting of the hijacker, In U.S. Pat. No. 4,359,733(filed: September 1980) is shown an extensive disclosure for a satellite-based aircraft-position determining system, which Is cited owing to its relevance to ATC(air-traffic control) VOR(Very-hi-frequency Omnidirectional Range) system of stations by which to provice reliable azimuth-path flight-information: plus, the disclosure relates to state-of-the-art GPS(global positioning systems) such as Navstar®.

In U.S. Pat. No. 4,706,091(filed: April 1986) is shown an airliner hijacking-alert communications system, wherein is provided a microphone, preamp, and RF-transmitter system by which to stealthfully send a realtime radio-signal to ground-tracking stations; and is actuated upon a pilot casually resetting a radio-dial to the hijack-alert frequency.

In U.S. Pat. No. 5,798,458(filed: August 1998) is shown an "acoustic catastrophic-event detection and data-capture and retrieval system for an airliner", wherein a plurality of acoustic-transponders (microphones) are situated about the airframe, and are adapted to communicate with a recording-monitor. Accordingly, in the event of a catastrophic-event such as an explosion, or audible structural-failure, the acoustic-event would be captured for subsequent recovery and analysis. Unfortunately the invention does nothing to prevent violent hijacking situations.

In U.S. Pat. No. 6,430,488(filed: April 1998 by IBM) is set forth usage of a known so-called "smart-card" water-thin credit-card sized device which contains microprocessor-circuitry as to enable pre-programming and thereby facilitate instant inputs relative to a vehicle such as a motor-vehicle, and thereby instruct certain commands to the vehicle's various onboard apparatus characterized as electronic-Islands connected to a controller. The smart-card is able to monitor control-settings not wholly unlike that akin to aircraft functions, and make appropriate readjustments thereof plus, a GPS(global positioning system) is employed in a manner as to restrict driving into certain geographic-locations.

Therefore, in full consideration of the preceding patent review, there is determined a need for an improved form of device to which these patents have been largely addressed. The instant inventor hereof believes their newly improved anti-hijacking apparatus, commercially presently referred to as the AIRCIA™-system, currently being developed for production under auspices of Moretto/R&D-Company exhibits certain advantages as shall be revealed in the subsequent portion of this Instant disclosure.

II.) SUMMARY OF THE INVENTION

A.) In view of the foregoing discussion about the earlier invention art, it is therefore important to make it pellucid to others interested in the art that the object of this invention is to provide a universally retrofitable cost-effective air and ground lifesaving function, requiring only minor-modification to enable an airliner to become impervious to attempt to commandeer control of the airliner's flight-controls. Referred to as the *AIRCIA™-system (*quasi-acronym for: "AIRliner Controlled Irreversible Anti-hijack"), my airliner anti-hijack system is instantly activated by either first(captain) or second pilot(copilot) simply by actuation of a simple electrical-switch situated readily within the normal motion of a hand;—such as may be located upon the steering-wheel or its supporting control-column, or along side of their seat(bottom-cushion portion) for example, the particularly critical mounting point for this AIRCIA™/actuator-switch should perhaps best be determined by a Human-factors/human-engineering study (with prime consideration as to one of the two pilots being able to activate their switch under physical duress). The essential notion of my invention being that once so actuated (whether willfully intentional or somehow executed accidentally), the AIRCIA-system cannot be deactivated, unless perhaps the option of a secret simple alphanumeric/coded-combination be entered (known only to the pilots), thereby preventing the would-be hijacker (intervenor) from being able to overcome the pilots and restore normal pilot-control operation of the aircraft. In lieu of such an option, a MARS (Master AIRCIA Reset Switch) (normal flight-control restore) provision is preferably located up inside of the nose-gear bay, where a key authorized ground-maintenance person would be able to readily restore normal-operation via a switch and alphanumeric-code.

Accordingly, during routine preflight/check-list procedure, the AIRCIA™-system is checked for effectiveness, and if all is properly operational the controls will respond and the engines will start, thus if the system checks-out to properly "okay" all flight-modes as intended, then the key/ground-technician is given the OK by the pilots to restore the NFC(normal flight-control) mode of the MARS/ECU (electronic control unit). Moreover, if the key/ground-technician were even to inadvertently revert the MARS modality to the AIRCIA-system, the engines would immediately kill (generally by opening the electrical-circuit activating the electric-fuelpumps for example) as a secondary precaution to obviate possibility of decisive sabotage. Therefore, once the airliner becomes self-mobile, then the Airliner's Captain is thus assured that the AIRCIA™-system is "good to go" (provided all of the other routine preflight procedures indicate the airliner to be flightworthy)! Once past TGV(terminal ground-velocity,—point at which the pilot cannot safely abort-takeoff relative to remaining runway), and the airliner becomes airborne, if the AIRCIA™-system is activated, the airliner is thrown into autopilot-modality, causing the plane to continue on in a normal manner although no flight-controls remain operational, including the pilots normally optional fuel-dump procedure (ie: if the landing-gear is down,—it stays down unless otherwise commanded by the friendly outside command-support group). Any attempt by the pilots or anyone to subsequently manually control the airliner via its control-column becomes, instantly annulled, whereby further control of the aircraft is conducted only by the outside AIRCIA™-system/Command-support Groups (that is, ACS and GCS).

Additionally, it is desired that my AIRCIA™-system employ use of a so-called "smart-card",—a well known wafer-thin solid-state computer-usable medium bearing computer-readable program-code means for causing the AIRCIA™-system's computer to respond to the user-pass like information conveyed to it. The AIRCIA™/SmartCard® is suitably pre/custom-programmed as to thereby communicate periodically up-dated stored-data particularly relevant to the Captain's associated Airline security-measures criteria, and is thus necessarily carried aboard the airliner (generally conveniently via the Captain's Flight/attache-case), and upon the pilots taking their respective flight seating-positions within the cockpit, is manually inserted into a "black-box" SmartCard®-entryslot arranged conveniently accessible to the pilots. The AIRCIA.TM./SmartCard® can also optionally install critically-precise x-y/azimuth-coordinates of certain national zones of off-limits restriction, thereby interfacing with the Airliner's existing GPS/Flight-system in a manner enabling the AIRCIA™-system to maneuver the aircraft around these "no fly zone"—landmarks. Had this provision been installed prior to Sep. 11, 2001, the infamous "flying/fuel-bomb" event could not have occurred, the Airliners AIRCIA™-system hereof would have simply taken-over and vectored the Airliners rather routinely therearound, and then commanded an uneventful phantom-pilot landing at the nearby N.Y./International-airport. Moreover, if the SmartCard's information and that expected by the AIRCIA™—system don't correspond as a requisite interface, then the aircraft's systems remain in a null-modality to defeat the Airliner's flight; —in other words, if the AIRCIA™/SmartCard detects some sort of tampering irregularity with the Airliner's vital Flight-systems, then the possibility of sabotage tentatively exists, and the Pre-flight Check-list procedure is summarily aborted (requiring deplaning of passengers from this Airliner until the problem is resolved). The AIRCIA™/SmartCard is preferably to remain inserted to monitor the otherwise essentially routine FAA-required Pre-flight Check of the Airliner's various flight-systems;—but once this Check-list procedure has been successfully completed with engines/flight-controls activated,—the card may be then removed and thoughtfully returned to the Captain's Flight/attache-case.

B.) Another object of this invention disclosure is to set forth a user-friendly foolproof anti-hijack system according to preceding item-A, wherein is provided the airliner's portion of the AIRCIA-system. The other portion of my system to effectively disable onboard flight-commands (hydraulic, electrical, mechanical, electronic, and all such vital operative components of airliner flight-control become obedient to and dependent upon the outside ground/command-support group), thereby rendering the airliner's guidance-systems basically irreversibly placed into total reliance upon its existing state-of-the-art autopilot-system in vital encrypted/RF-communicated remote-control by skilled authorized ground-personnel. This procedure is preferably enhanced by 24/7-ready military/air-interceptors (preferably 2-place jet-aircraft), being AIRCIA™-system trained-pilots, capable of executing smooth RF/remote-control of an airliner if for some reason the onboard autopilot and satellite positional geo-navigation system were rendered inoperable. In either case, the disabled airliner with crew, passengers, and would-be hijacker, are passively vectored to land safely at an airport determined appropriate by AIRCIA's™ authorized/ground-personnel (such as a military-airbase for example).

C.) Another object of this invention disclosure is to set forth a user-friendly foolproof anti-hijack system according to preceding summary items-A&B, wherein a further provision of my AIRCIA-system, is to become automatically activated in the remote but possible event of a "natural-cause" (not criminally induced) incapacitation of both pilots;—such as might be induced by a cockpit electrical/short-circuit causing blinding smoke, or noxious-fumes for example. In these sort of occurrences, either pilot could likewise activate the AIRCIA™-system (then optionally retreat to the passenger-cabin section and close the cockpit-door too isolate the problem), as has been outlined in item-A. However, aside from terrorists,—there may also be other sorts of pilot debilitating events, possibly such as accidental oxygen-deprivation, wherein both pilots become lulled into sleep; wherein a cockpit sound-monitor (as might for example be based upon ITT's/Voxware® VRS(voice-recognition system), would be automatically prompted to audibly announce: . . . " AIRCIA™-system cockpit-monitor has detected no pilot presence (that is, for example, no physical-activity nor talking for the past 7½ minutes,—if all is all right a just say:—pilots OK!". After three such query-prompts without detecting a lucid response,—the AIRCIA™-system would thus progress into a self-activating modality of operation upon announcing a count-down to zero-seconds . . . then announcing: "AIRCIA™-system now activated"-issuing thereafter once every minute or so.

Another option of my AIRCIA™-system is to induce a mild infusion of a harmless respiratory acting tranquilizing-gas into the airliner's entire cockpit and passenger-cabin environment automatically upon emergency-activation of AIRCIA™. This provision requires installation of at least one pressure-tank of a medically-approved tranquilizing-gas ingredient in the cargo-bay, which lightweight filament-wound cylinder would include three redundant solenoid-valves (in line) in order to obviate potential release of the sleep-inducing gas through valve-malfunction. It is believed that the practical feasibility of implementing such a co-acting apparatus would preclude some otherwise violent frantic attempt by a hijacker(s) to wreak havoc within the environ of the airliner, were they to find frustration in their otherwise defeated attempt to physically commandeer the airliner. Plus, once the airliner has been safely landed via my AIRCIA™-system, an awaiting SWAT-team would be able to quickly board the airliner, and seize the offending marauders into custody while still in a groggy state,—before ambient-air reviving ensues as the cabin/cockpit environs become aerated.

III.) DESCRIPTION OF THE PREFERRED EMBODIMENT DRAWINGS

The foregoing and still other objects of this invention will become fully apparent, along with various advantages and features of novelty residing in the present embodiments, from study of the following description of the variant generic species embodiments and study of the ensuing description of these embodiments. Wherein indicia of reference are shown to match related matter stated in the text, as well as the claims section annexed hereto: and accordingly, a better understanding of the invention and the variant uses is intended, by reference to the drawings, which are considered as primarily exemplary and not to be therefore construed as restrictive in nature; wherein:

FIG.-1, is a schematic-diagram representative of my basic AIRCIA™-system, showing the general relationship of the various existing airliner on-board sub-component systems in conjunction with my AIRCIA/GCS & ACS remote-control command units; plus my optional AIRCIA™/SmartCard® and on-board ATI-system ancillary feature.

IV.) ITEMIZED NOMENCLATURE REFERENCES

10'/10"—seating-positions (1st-pilot / 2nd-pilot)
11'/11"—pilot control-columns (1st-pilot / 2nd-pilot)
12'/12"—pilot control-wheels (1st-pilot / 2nd-pilot)
13'/13"—pilots AIRCIA™ actuator-switches (1st-pilot / 2nd-pilot)
14'/14"—pilots flight-control conduit
15—existing flight/control-conduit
16—pilots normal flight/control-conduit
17'/17"—AIRCIA™ flight-control circuit-routing: A-mode / B-mode
18—pilots go/no-go portion of switching-relay
19—AIRCIA™ go/no-go portion of switching-relay
20'/20"—existing interconnective-conduiting
21—existing Avionics/flight-control system
22—retrofitable AIRCIA™/MARS flight-control system ECU-junction
23'/23"—retrofitable hardwired Interconnective-circuiting: diag.ref.-left / diag.ref.-right
24—voice-recognition auto-engager for AIRCIA™
25,25'—AIRCIA™/SmartCard®, card-insertion action/ref.-arrow
26'.26"—existing hydraulic-system, existing electrical-system
27—existing engine-control system
28—existing autopilot-system
29—existing radar-system
30—existing communication-system
31—optional ATI-system
32'.32"—ATI gas-reservoir unit, ATI solenoid-valve unit
33—ATI gas-distribution outlets
34—AIRCIA™/GCS-guidance representation
35—AIRCIA™/ACS-guidance representation
38E,36/36'/36"—AIRCIA™/RF-equip.: RF-signals (airliner-sys./ ground-sys./ airborne-sys.)

V.) DETAILED DESCRIPTION OF THE PREFERRED EMBODIMENTS

General reference is given by way of FIG.-1, wherein Is exemplified a basic systems flow-chart revealing how my anti-hijack AIRCIA™-system augmentation essentially combines sophisticated supplementation to an exemplified airliner's existing shown Avionics-system 21 and its normal interconnections to the existing exemplified six Flight/support-systems generally identified as hydraulic 26', electrical 28", engine-control 27 (single, or generally plural turbojet-engines), autopilot 28, radar 29, and transceiver communications 30; all of which function in concert to enable usual safe control of the aircraft. In this normal Avionics modality of conventional flight operation, the pilots located at cockpit seating 10'(captain/1st-pilot) and 10"(co-pilot/2nd-pilot) leave the onboard AIRCIA™-system 22 into null-mode/"B.)" while the pre-existing Avionics-system 21 is relay-switched 18 into active-mode/"A.)". In this modality of operation, the airliner can either be flown entirely "hands-on", or the pilots can switch over to the conventional Autopilot 28 procedure, whereby the airliner is customarily vectored according to predetermined destination coordinates.

However, it an emergency hijacking situation were to be encountered, either of the pilots 10'/10" can quickly activate the airliner's AIRCIA™-system via a conventional normally protectively-shrouded flip-cover arrangement located readily at hand, preferably mounted, for example, upon the pilots respective steering-wheels 12' and 12": whereby a quick flick of the thumb or finger upon the enshrouding flip-cover (not shown) would expose the AIRCIA button or toggle type "irrevers"-switches 13' or 13". Accordingly, once so activated the AIRCIA-system is basically non-reversible as to having thereby placed the Avionics-system 21 into null-mode/"B.)" via the Avionics portion 16 of the switching-relay, while simultaneously activating the AIRCIA-system 22 to thereby be in command of the exemplified six Flight/support-systems (26', 26", 27, 28, 29, 30) via activate-mode/"B.") of the AIRCIA portion 19 of the switching-relay; which are thereby given to sole command by the ground and air-intercept coordinating authorities 34 and 35. Therefore, in effect, the flight-control switching-relay arrangement 18 and 19 can thus be somewhat likened to a double-pole/double-throw type arrangement, whereby the already identified system components 26–30 remain essentially central to the oppositely opposed Avionics circuit-routing 20'/20", and AIRCIA circuit-routing 23'/23" respectively.

There remain subtle, however vital other differences which are to become herein more evident and understood as important improvements. For example, FIG.-1 also reveals how once one of the airliner's pilots has activated the AIRCIA-system as stated, the communications-system 30 either passively (by lack of an RF-transmission) or overtly (by transmission of a specially encrypted RF-signal 36) notifies the AIRCIA/GCS(ground/command-support)-group Command as to a probable hijacking event or other potentially catastrophic equivalent, such as a VRS 24 detected freak-of-nature disabling of the pilot ability to safely fly the airliner. In such event, the well trained AIRCIA-system authorities (probably under federal oversight such as via the FAA) would then commence to guide the airliner to land at a suitable airport, and would probably include immediate notification to a coordinating AIRCIA/ACS(air-intercept/command-support)-unit combat-flight Commander, whose interceptor-aircraft would be outfitted with AIRCIA/RF (radio-frequency)-equipment as to thereby enable that ACS-unit Commander(pilot or his copilot) to thus remotely-control (via exemplified RF-signal control-beam 36") the Avionics of the airliner as a shadow-aircraft through advantage of actual DVO(direct visual observation)coordination (otherwise, the AIRCIA/GCS-group having to rely essentially upon blind remote-control).

The optional VRS(voice-recognition system) 24 functions by way of a cockpit realtime/voice-monitoring microprocessor-controlled audio-system, whereby unusual absence of pilot activity, would (after preliminary audio promptings) automatically transfer the pilots command of the airliner over to control via the AIRCIA-system. Similarly, the pilots would, prior to any takeoff, be caused to include as part of their routine preflight/check-list procedure, activation of the AIRCIA-system (such as via the said AIRCIA/actuator-switches 13'/13") which circuiting 22 includes an ECU-microprocessor in electrical-communication with the "irrevers"/selector-switch(es) 13'/13", and the pilots must then await issuance of an RF-signal (or equivalent control-tower simulated test-signal) from the AIRCIA/GCS-group 34 before the airliner's propulsion-engines (activated via existing engine-control system 27) would actually spool-up and produce propulsion thrust;—at which point (upon passing the preflight-test) the AIRCIA-system is normally reset to standby (deactivated), enabling full pilot control of the Avionics systems (21, plus 25–30) in a completely conventional manner.

An important option provided by this disclosure is the employment of a novel AIRCIA™/SmartCard® device 25, which is based upon well known industrial/commercial product implementations, and which background is further referenced in the following ScientificAmerican®-monthly magazine articles:

a.) SA-08/2002(Vol.-287/Pg.-86) wherein a brief excerpt states: "a smart-card's microprocessor generates complex passwords that are difficult to decode and prevent unauthorized persons from using it . . . "

b.) SA-06/1991(Vol.-264/Pg.-116) wherein a brief excerpt states: "custom memory cards have already found their way into industrial applications such as aircraft flight-testing and inventory-control . . . companies pursuing the technologies include—Apple, Chips&Technologies, Databook . . . "

c.) SA-01/1989(Vol.-260/Pg.-101) wherein a brief excerpt states: "a single smart-card can carry the data for multiple accounts . . . and, can encrypt its data and release it only in response to specified passwords . . . "

d.) SA-11/1985(Vol.-253/Pg.-152) wherein a brief excerpt states: "smart-cards could be used as high-security keys; smart-cards having two essential properties that make them invulnerable . . . first, a smart-card has nonvolatile programmable read-only Memory . . . and second, each smart-card contains its own control processing unit, bringing about a true union between telecommunication and computing . . . ".

Hence, while this disclosure introduced no new structure to smart-card design and production, it does however, introduce a vital new apparatus interface implementation, and particular manner of Airliner-cockpit usage;—being set forth herein as to further enhance the basic concept and user-friendliness of my AIRCIA™-System. Accordingly, upon pilot's manual insertion of the AIRCIA™/SmartCard® into an appropriate commercially existing-hardware card/entry-slot (suggested here via attendant action/ref.-arrow 25'), the myriad microprocessor/memory-circuits invisibly (to the unaided eye) contained within the substantially conventional (except for its special programming) smart-card 25 instantly interface with the special AIRCIA-system operatives.—Thereby actively conveying, comparing, and receiving system information critical for speedy determination as to the vital question of safety-status (ie:—has this aircraft been criminally tampered-with since its last safe flight and landing?); and as though a silent-sentinel on guard during the ensuing time-period (be it minutes, hours, or days), the safeguard detection-procedures provided will readily reveal most any such adverse tampering. Additionally, the AIRCIA™/SmartCard® can be pre-programmed with any desired number of national (and International) flight intrusion-prevention azimuth-coordinates, which correspond to possible terrorist-target sites (such as particular buildings, bridges, etc.), and if such identified site is being critically approached (ie: —computed as to close at the indicated air-speed and distance) by the terrorist-commandeered Airliner, then my AIRCIA™-System will irreversibly assume full-control of the Airliner in a manner as has already been explained.

Also set forth herein is the option of my ATI(automatic tranquil-Infusion)-system, which generally entails the installation of a lightweight filament-wound pressure-tank 32' (a reservoir preferably located within the baggage-compartment beneath the passenger-cabin) coupled via quick-disconnect to one or more solenoid-valves 32", which are remotely actuated via the AIRCIA GCS 34 or ACS 35 commanders, preferably as the airliner is being guided-In on approach to a selected airport. Once so opened, the solenoid-valve(s) 32' Immediately release the special TwilliteGas™ into the airliner's entire interior environ, via a pressure-conduit feeding plural spaced apart cabin and cockpit gas-distribution outlets 33, which functions to place all persons aboard the airliner (including the aircrew), into a mild induced sleep;—intended to further reduce any attempt of panicked individuals (hijackers or passengers) from committing an act which might cause damage to the airliner before airport rescue-personnel are able to conduct their trained procedures (Including arrest of any hijackers).

Thus, it is readily understood how the preferred and generic-variant embodiments of this invention contemplate performing functions in a novel way not heretofore available nor realized. It is implicit that the utility of the foregoing adaptations of this invention are not necessarily dependent upon any prevailing invention patent; and, while the present invention has been well described hereinbefore by way of certain illustrated embodiments, it is to be expected that various change, alterations, rearrangements, and obvious modifications may be resorted to by those skilled in the art to which it relates, without substantially departing from the implied spirit and scope of the instant invention. Therefore, the invention has been disclosed herein by way of example, and not as imposed limitation, while the appended claims set out the scope of the invention sought, and are to be construed as broadly as the terminology therein employed permits, reckoning that the invention verily comprehends every use of which it is susceptible. Accordingly, the embodiments of the invention in which an exclusive property or proprietary privilege is claimed, are defined as follows:

VI.) What is claimed of proprietary inventive origin is:

1. Anti-hijack flight control-system augmentation preventing commandeering of an aircraft; said anti-hijack augmentation comprising:

a normally nulled electrical "irrevers"/selector-switch means located proximal pilot's existing flight control-column, whereby manual actuation of said "irrevers"/selector-switch places aircraft's existing avionics autopilot-system into an irreversible modality of emergency operation rendering the aircraft uncontrollable by anyone aboard;

an AIRCA/ECU-microprocessor arranged in electrical-communication with said "irrevers"/selector-switch means, whereby the biasing of said "irrevers"/selector-switch instantly activates the AIRCA-system circuit thus incapacitating any further response to commands executed from within aircraft's control-cabin.

2. The aircraft anti-hijack augmentation according to claim-1, wherein an AIRCA-notify RF-signal is issued from the aircraft to ground or satellite stations upon activation of said "irrevers"/selector-switch, thereby alerting GCS flight-coordination personnel as to hostile takeover of the aircraft along with its vital-signs, whereby aircraft is then remotely-vectored to a landing-strip determined appropriate by these authorized outside said flight-coordination personnel alone.

3. The aircraft anti-hijack augmentation according to claim-1, wherein an AIRCA-notify RF-signal issued from the aircraft to ground or satellite stations upon activation of said "irrevers"/selector-switch, thereby alerting GCS flight-coordination personnel as to hostile takeover of the aircraft along with its vital-signs, whereby aircraft is then remotely-vectored to a landing-strip determined appropriate by these authorized outside said flight-coordination personnel which includes an intercepting airborne ACS-unit commander acquiring direct visual monitoring and realtime remote-control of the dependent aircraft's AIRCIA-system.

4. The aircraft anti-hijack augmentation according to claim-1, wherein said AIRCA/ECU-microprocessor is located inaccessibly outside of said fuselage-cabin, yet in electrical-communication with said "irrevers"/selector-switch means; and whereby physical interruption of said electrical-communication disables the aircraft from initial start-up procedure, and if such disconnection is made while in flight then said AIRCA-system is automatically activated to take full control of the aircraft.

5. The aircraft anti-hijack augmentation according to claim-1, wherein said AIRCA-system means is integrated to aircraft's existing preflight/check-list procedure, whereby if the preflight-test reveals at least one of the vital operatives of said AIRCA-system to be defeated from activation via simulated emergency-activation, said AIRCA/ECU-microprocessor thus determines the aircraft to be un-flightworthy, thereby preventing its engine(s) from starting toward becoming airborne.

6. The anti-hijack augmentation according to claim-1, wherein said AIRCA/ECU-microprocessor is pre-programmed to interface with an ATI-system which can be automatically actuated by either the AIRCIA/GCS or AIRCIA/ACS systems to release a so-called Twilight-gas in sufficient quantity as to induce a state of mild sleep to the aircraft's inhabitants while the aircraft is safely being remotely flight controlled.

7. The anti-hijack augmentation according to claim-1, wherein said AIRCIA/ECU-microprocessor includes a VRS-system programmed to monitor the pilots cockpit presence, whereby if after a predetermined period of time no activity is detected, then the aircraft is automatically placed under full control of the AIRCIA-system.

8. The anti-hijack augmentation according to claim-7, wherein said AIRCIA/ECU-microprocessor's VRS-system is programmed to monitor for approximately 7½ minutes for example, then said VRS-system will activate an electronically programmed announcement requesting a pilot answer if all is aright, and if there be no audible response then the a count-down ensues for the pilots to hear prior to the AIRCIA-system automatically switching into self-activating modality of operation; whereupon the aircraft is placed into irreversible AIRCIA control.

9. The anti-hijack augmentation according to claim-1, wherein a smart-card is provided which is pre-programmed to interface with the aircraft's existing avionics so as to detect possible tampering abnormality thereof by conveying, comparing, and receiving computerized information during normal pre-flight check-list procedure, and thereby automatically prevent start-up sequencing of the aircraft's engines if analysis is adverse.

10. The anti-hijack augmentation according to claim-9, wherein said smart-card is additionally pre-programmed with various x-y/aximuth-coordinates for interfacing with aircraft's existing GPS/Flight-system, causing certain predetermined landmarks to be treated as "no fly zones", and thereby causing the aircraft to automatically maneuver safely around said landmarks.

11. Anti-hijack flight control-system augmentation preventing commandeering of an aircraft; said anti-hijack augmentation comprising:

a smart-card pre-programmed to interface with the aircraft's existing avionics so as to detect possible tampering abnormality thereof by conveying, comparing, and receiving computerized information during normal pre-flight check-list procedure, and thereby automatically prevent start-up sequencing of the aircraft's engines if analysis is adverse;

a normally nulled electrical "irrevers"/selector-switch means located readily accessible to the pilots, whereby actuation of said "irrevers"/selector-switch places aircraft's existing autopilot-system into an irreversible modality of emergency operation rendering the aircraft uncontrollable by anyone aboard;

an AIRCA/ECU-microprocessor arranged in electrical-communication with said "irrevers"/selector-switch means, whereby initial biasing of said "irrevers"/selector-switch instantly activates the AIRCA-system circuit thus incapacitating any further response to commands executed from within aircraft's control-cabin;

an AIRCA-notify RF-signal issued from the aircraft to ground or satellite stations upon activation of said "irrevers"/selector-switch, thereby alerting flight-coordination personnel as to hostile takeover of the aircraft along with its vital-signs, whereby aircraft is then remotely-vectored by GCS to a landing-strip determined appropriate by these authorized outside said flight-coordination personnel alone.

12. The aircraft anti-hijack augmentation according to claim-11, wherein said AIRCA/ECU-microprocessor is located inaccessibly outside of said fuselage-cabin, yet in electrical-communication with said "irrevers"/selector-switch means; and whereby physical interruption of said electrical-communication disables the aircraft from initial start-up procedure, and if such disconnection is made while in flight then said AIRCA-system is automatically activated to take full control of the aircraft.

13. The aircraft anti-hijack augmentation according to claim-11, wherein said AIRCA-system means is integrated to aircraft's existing preflight/check-list procedure, whereby if the preflight-test reveals at least one of the vital operatives of said AIRCA-system to be defeated from activation via simulated emergency-activation, said AIRCA/ECU-microprocessor thus determines the aircraft to be un-flightworthy, thereby preventing its engine(s) from starting toward becoming airborne.

14. The anti-hijack augmentation according to claim-11, wherein said AIRCA/ECU-microprocessor is also pre-programmed to interface with an ATI-system which can be automatically actuated by either the AIRCIA/GCS or AIRCIA/ACS systems to release a so-called Twilight-gas in sufficient quantity as to induce a state of mild sleep to the aircraft's inhabitants while the aircraft is safely being remotely flight controlled.

15. The anti-hijack augmentation according to claim-11, wherein said AIRCIA/ECU-microprocessor's VRS-system is programmed to monitor for approximately 7½ minutes for example, then said VRS-system will activate an electronically programmed announcement requesting a pilot answer if all is aright, and if there be no audible response then a count-down ensues for the pilots to hear prior to the AIRCIA-system automatically switching into self-activating modality of operation; whereupon the aircraft is placed into irreversible AIRCIA control.

16. The anti-hijack augmentation according to claim-11, wherein said smart-card is additionally pre-programmed with various x-y/azimuth coordinates for interfacing with aircraft's existing GPS/Flight-system, causing certain pre-determined landmarks to be treated as "no fly zones", and thereby causing the aircraft to automatically maneuver safely around said landmarks.

17. The aircraft anti-hijack augmentation according to claim-11, wherein said AIRCA-notify RF-signal issued from the aircraft to ground or satellite stations upon activation of said "irrevers"/selector-switch, alerts GCS flight-coordination personnel as to hostile takeover or other incapacitation of the aircraft, whereby the aircraft is intercepted by an airborne ACS-unit acquiring direct visual monitoring and realtime remote-control of the dependent aircraft's AIRCIA-system, as to thereby vector the dependent aircraft to a landing-strip determined appropriate by either the ACS-unit commander or the central GCS-group command.

18. Anti-hijack flight control-system augmentation preventing commandeering of an aircraft; said anti-hijack augmentation comprising:

a smart-card pre-programmed to interface with the aircraft's existing avionics so as to detect possible tampering abnormality thereof by conveying, comparing, and receiving computerized information during normal pre-flight check-list procedure, and thereby automatically prevent start-up sequencing of the aircraft's engines if analysis is adverse;

a said smart-card pre-programmed with various x-y/azimuth-coordinates for interfacing with aircraft's existing GPS/Flight-system, causing certain predetermined landmarks to be treated as "no fly zones", and thereby causing the aircraft to automatically maneuver safely around said landmarks; a normally nulled electrical "irrevers"/selector-switch means located readily accessible to the pilots, whereby actuation of said "irrevers"/selector-switch places aircraft's existing autopilot-system into an irreversible modality of emergency operation rendering the aircraft uncontrollable by anyone aboard;

an AIRCA/ECU-microprocessor arranged in electrical-communication with said "irrevers"/selector-switch means, whereby initial biasing of said "irrevers"/selector-switch instantly activates the AIRCA-system circuit thus incapacitating any further response to commands executed from within aircraft's control-cabin;

an AIRCA-notify RF-signal issued from the aircraft to ground or satellite stations upon activation of said "irrevers"/selector-switch, thereby alerting flight-coordination personnel as to hostile takeover of the aircraft along with its vital-signs, whereby aircraft is then remotely-vectored to a landing-strip determined appropriate by these authorized outside said flight-coordination personnel alone.

19. The aircraft anti-hijack augmentation according to claim-18, wherein said AIRCA/ECU-microprocessor is located inaccessibly outside of said fuselage-cabin, yet in electrical-communication with said "irrevers"/selector-switch means; and whereby physical disconnection of said electrical-communication disables the aircraft from initial start-up procedure, and if physical disconnection is made while in flight then said AIRCA-system is automatically activated for remote GCS control of the aircraft.

20. The anti-hijack augmentation according to claim-18, wherein said AIRCIA/ECU-microprocessor includes a VRS-system programmed to monitor the pilots cockpit activity presence, whereby if after a predetermined period of time such as 7-minutes no activity is detected then said VRS-system will activate an electronically programmed announcement requesting a pilot answer if all is aright, and if there be no audible response then an audible count-down further ensues for the pilots to hear prior to the AIRCIA-system automatically switching into self-activating modality of operation; whereupon the aircraft is placed into irreversible AIRCIA control.

* * * * *